US012810105B2

(12) United States Patent
Yeap et al.

(10) Patent No.: US 12,810,105 B2
(45) Date of Patent: Nov. 24, 2026

(54) PRINTED CIRCUIT WITH SURFACE MOUNT CAPACITOR FOR INTEGRATION INTO A SMART CARD

(71) Applicant: LINXENS HOLDING, Mantes la Jolie (FR)

(72) Inventors: Yean Wei Yeap, Singapore (SG); Cindy Ng, Singapore (SG); Thomas Decker, Dresden (DE)

(73) Assignee: LINXENS HOLDING, Mantes-la-Jolie (FR)

( * ) Notice: Subject to any disclaimer, the term of this patent is extended or adjusted under 35 U.S.C. 154(b) by 0 days.

(21) Appl. No.: 18/713,080

(22) PCT Filed: Nov. 30, 2021

(86) PCT No.: PCT/IB2021/000833
§ 371 (c)(1),
(2) Date: May 23, 2024

(87) PCT Pub. No.: WO2023/099928
PCT Pub. Date: Jun. 8, 2023

(65) Prior Publication Data
US 2025/0021786 A1 Jan. 16, 2025

(51) Int. Cl.
*G06K 19/077* (2006.01)
*G06K 19/073* (2006.01)

(52) U.S. Cl.
CPC ..... *G06K 19/07783* (2013.01); *G06K 19/073* (2013.01)

(58) Field of Classification Search
CPC ............ H01Q 7/00; H01Q 9/27; H01Q 13/10; H01Q 1/2225; G06K 19/07783;
(Continued)

(56) References Cited

U.S. PATENT DOCUMENTS 6,522,308 B1 * 2/2003 Mathieu ........... G06K 19/07779 343/895
2008/0122623 A1 * 5/2008 Hause .................... G06K 17/00 340/572.1
(Continued)

FOREIGN PATENT DOCUMENTS

JP 6233716 B2 * 11/2017 ......... H01L 23/5227
JP 2019505891 A 2/2019
(Continued)

OTHER PUBLICATIONS

Advances in class-I C0G MLCC and SMD film capacitors (Year: 2008).*
(Continued)

*Primary Examiner* — Thien T Mai
(74) *Attorney, Agent, or Firm* — DITTHAVONG, STEINER & MLOTKOWSKI

(57) ABSTRACT

The present disclosure refers to a printed circuit for integration in a smart card, wherein the printed circuit comprises a printed circuit substrate of dielectric material, an antenna having a resonance frequency, one or more contact pads forming an external contact pattern, and at least one surface mount (SMD) capacitor connected to the antenna so as to adjust its resonance frequency, in order to match a predefined resonance frequency, for instance a resonance frequency comprised within the range defined in ISO 14443 standards. The present disclosure also refers to a module comprising the above-indicated printed circuit and an IC chip and to a corresponding smart card.

17 Claims, 6 Drawing Sheets

(58) Field of Classification Search
CPC ....... G06K 19/07779; G06K 19/07749; G06K 19/073; G06K 19/07756; G06K 19/07788; G06K 19/07; G06K 19/07775; G06K 19/07747; G06K 19/07773; G06K 19/07745; G06K 19/0701; G06K 19/07754; G06K 19/07733; G06K 19/07743
See application file for complete search history.

(56) References Cited

U.S. PATENT DOCUMENTS

| | | | | |
|---|---|---|---|---|
| 2010/0052859 | A1* | 3/2010 | Lossau | H01Q 7/00 343/729 |
| 2015/0269471 | A1* | 9/2015 | Finn | B23K 26/0622 29/601 |
| 2016/0146886 | A1* | 5/2016 | Finkenzeller | H04B 17/16 324/603 |
| 2017/0109622 | A1* | 4/2017 | Cepress | G06K 19/07737 |
| 2018/0351233 | A1* | 12/2018 | Janvrin | H01Q 1/2208 |
| 2018/0373970 | A1* | 12/2018 | Seban | G06K 19/07794 |

FOREIGN PATENT DOCUMENTS

| | | | | |
|---|---|---|---|---|
| WO | WO-0021032 | A1 * | 4/2000 | G06K 19/0723 |
| WO | 2019198527 | A1 | 10/2019 | |

OTHER PUBLICATIONS

VCO Active Integrated Antenna With Reactive Impedance Surfaces (Year: 2005).*

International Search Report and Written Opinion of the International Searching Authority for related International Application No. PCT/IB2021/000833, dated Jul. 18, 2022, 10 pages.

* cited by examiner

PRINTED CIRCUIT WITH SURFACE MOUNT CAPACITOR FOR INTEGRATION INTO A SMART CARD

FIELD OF THE INVENTION

The invention relates to a printed circuit with a surface mount (SMD) capacitor for integration into a smart card, a smart card with such a printed circuit and to a reel-to-reel tape for use in a fabrication process of a smart card, wherein the reel-to-reel tape comprises a plurality of such printed circuits. In particular, the present disclosure relates to a dual interface printed circuit for a dual interface (DIF) smart card.

STATE OF THE ART

Smart cards are increasingly used in the everyday life as payment cards, SIM cards for mobile phones, transport cards, identity cards and the like. There is a strong effort to integrate an increasing number of functions into a smart card for making smart cards more versatile in the application of everyday life.

Typically, a smart card includes transmission means for transmitting data from a chip of the smart card to a card reader device or vice versa. The transmission means can be a contact interface in which a direct electrical contact to an external contact element of the smart card is established and a card reader is able to communicate with the chip of the smart card via a direct electrical contact. Another way of communicating with a chip of the smart card is in a contactless manner by a contactless interface, using an antenna integrated into the smart card, allowing to communicate with the chip of the smart card in a contactless manner.

In a plurality of current card designs, a double interface is provided for not only allowing contactless communication with a chip of a smart card, but also providing an electric contact for directly contacting the chip of the smart card with a card reader device in a contact manner. Such a double interface transmission means is generally referred to as "dual" in case that a contact mode and a contactless mode are managed by a single chip of the smart card.

Typically, a dual interface (DIF) smart card consists of a rigid plastic support such as PVC, PVC/ABS, PET or polycarbonate, constituting a card body of the smart card into which one or more printed circuits are incorporated. For example, in a common approach, an antenna is integrated into a laminated body (a laminated body prepared at an early stage during fabrication of a smart card, i.e., before integrating electronic chips into the smart card, in the following referred to as a "prelam body"), which is in turn integrated into a card body. One (or more) cavity is milled in the card body to allow the embedding of one (or more) smart card modules containing a printed circuit and a chip and its connection to the antenna.

The fabrication of such a conventional DIF smart card is very complex because the antenna is usually prepared and integrated at a first factory by means of a so-called antenna inlay, whereas the smart card printed circuit and the integrated modules are manufactured in a second and third factory and a further customization of the prelam body into a card body and the integration of the smart card module into the card takes place at another (fourth) factory. Herein, an inlay is a product integrating an electronic device within a sheet carrier, where single layers with embedded electronics are fused together under pressure and temperature during the lamination process to form one homogeneous and durable sheet carrier. In this regard, an antenna inlay is understood as a pattern of an electrical conductive track routed as a pattern forming a circuitry in a sheet carrier to send and receive electromagnetic signals, such as a wire antenna formed of one or more loops of a conductive material (e.g., copper or aluminum).

The embedding of a wire antenna as an inlay into a smart card becomes problematic when considering materials of the smart card other than the materials providing a plastic prelam body. For example, it is very difficult to provide a wire embedding for an antenna inlay in a prelam body formed of wood, ceramic or metal or some other non-plastic material.

Moreover, there is a need for a card antenna for banking card application to comply with EMVCo Standards. In particular, it is necessary for the card antenna to pass the EMVCo PICC Analogue Tests.

Finally, there is a need for the card antenna to be compatible with different Integrated Circuit (IC) chips to be used in the module, for instance with IC chips having different capacitances, and to ensure communication with external card readers.

It is therefore an object of the present invention to solve one or more of the above-indicated problems.

BRIEF SUMMARY OF THE DISCLOSURE

The present disclosure proposes to integrate contact and contactless features of a smart card into a single element, thereby eliminating the need of a wire antenna inlay separate from the module bearing the contact pattern and allowing a connection with contact readers. In this way, a greater variety of materials may be used in the fabrication of the card body of a smart card.

Moreover, the proposed solution can be used for a great variety of IC chips having different capacitance, because the proposed printed circuit further includes one or more SMD capacitors, each having a predefined capacitance, which allows to tune the resonance frequency of the printed circuit so as to match a predefined resonance frequency. According to one or more embodiments, the predefined capacitance of the one or more SMD capacitors may compensate a low inductance of the antenna of the circuit. Producing one printed circuit that is compatible with a variety of IC chips leads to a simplification for the tape manufacturer process (for instance, only one set of tools is needed) and the logistics of the producer of the packaged module (for instance, it is necessary to handle only one reference of printed circuit whatever the chip to be used).

Furthermore, the proposed solution according to one or more of the embodiments defined below fully complies with the EMV standards and has been shown to have passed all the EMVCo L1 PICC analog tests.

In a first aspect of the present disclosure, a printed circuit for integration in a smartcard is provided, the printed circuit comprising:

- A printed circuit substrate of the electric material having a first side and a second side;
- An antenna having a wiring pattern extending between a first terminal and a second terminal and being located on the first side of the printed circuit substrate, the antenna having a resonance frequency;
- One or more contact pads located on the second side of the printed circuit substrate and forming an external contact pattern;

characterized in that, the printed circuit further comprises at least a first surface mount (SMD) capacitor connected to the first terminal and the second terminal of the antenna, so as to adjust the resonance frequency of the antenna, in order to match a predefined resonance frequency, for instance a resonance frequency comprised within the range defined in ISO 14443 standards.

The advantage of this solution is that it provides a printed circuit for integration in a smartcard, which allows an adjustment of the resonance frequency by means of one or more SMD capacitors, in order to keep the resonance frequency of the printed circuit to the optimum value for obtaing the best EMVCo L1 PICC Analog performance. For instance the resonance frequency may be comprised within the range defined in ISO 14443 standards. Moreover, the present solution allows to integrate the contact and contactless features for a smartcard in a single printed circuit, thus eliminating the need of providing an antenna inlet for the card body.

For example, depending on the capacitance of the IC chip connected to the antenna of printed circuit, one or two SMD capacitors may be advantageously connected to the antenna, so as to adjust the capacitance and thus the resonance frequency of the resulting electronic circuit and to match a predefined resonance frequency within the standard RFID communication range. For instance, a first SMD capacitor may have a capacitance of 470 pF. For instance, a second capacitor may have a capacitance of 20 pF.

According to a preferred configuration, the printed circuit may be used for integration in a dual smartcard, that is a smartcard which can provide contact and contactless functions.

Preferably, the antenna is an etched antenna having a wiring pattern that continuously extends between a first terminal and a second terminal.

According to a preferred configuration, an electronic circuit comprising the antenna connected to the IC chip may be formed, wherein the electronic circuit has a resonance frequency depending on the inductance of the antenna and on the internal capacitance of the chip. Therefore, one or more SMD capacitors may be advantageously added to the circuit for adjusting (increasing) the capacitance of the resulting electronic circuit and for compensating variations in the internal capacitance of the different chips and/or for compensating low values of the antenna inductance. The resulting resonance frequency of the resulting electronic circuit is preferably tuned to communicate with an RFID system operating for instance at 13.56 MHz or even 14 MHz.

Preferably, one or more contact pads forming an external contact pattern are located on the second side of the printed circuit substrate, opposite to the first side comprising the antenna and the one or more SMD capacitors. The one or more contact pads are configured to be electrically connected to an external device, for example an external reader, so as to power the IC chip and to allow communication and exchange of information between chip and reader when operating the smartcard in contact mode.

According to a further embodiment of the present invention, a printed circuit is provided, the printed circuit further comprising a second SMD capacitor connected to the first terminal and the second terminal of the antenna, in order to fine tune the resonance frequency of the antenna.

The advantage of this configuration is that the two SMD capacitors may be connected in parallel to the antenna so as to adjust the capacitance of the circuit and to fine-tune the resonance frequency of the circuit so as to match a predefined resonance frequency, for instance a resonance frequency comprised within the range defined in ISO 14443 standards.

For example, depending on the user's needs, the second SMD connector may be or may not be connected to the antenna in order to to fine-tune the resonance frequency of the circuit. Preferably, the SMD connector may be or may not be fixed to a corresponding etched path connected to the etched antenna.

According to a preferred embodiment, a printed circuit may be provided, wherein the antenna has a low inductance, for instance an inductance of approximately 0.25 μH. For instance, the low inductance may be due to a low number of total turns in the wiring pattern (e.g. two, three or four total turns) and/or to a wide width of each wire in the wiring pattern, for instance comprised between 500 μm and 1000 μm. A first SMD capacitor may be advantageously connected to the antenna so as to compensate for the low inductance and so as to obtain a resonance electric circuit having a resonance frequency meeting predefined resonance frequency. For instance, the first SMD capacitor may have a first capacitance of 470 pF. In this way, a coarse tuning of the resonance frequency may be obtained. A second SMD capacitor may be further added to the circuit in order to further adjust the resulting resonance frequency. For instance, the second SMD capacitor may have a second capacitance of 20 pF. The purpose of the second SMD capacitor is that of fine-tuning the resonance frequency, in the event that the resulting electronic circuit still does not have the desired frequency after addition of the first SMD capacitor.

According to a further embodiment of the present invention, a printed circuit is provided wherein the antenna has a low inductance, for instance lower than 0.5 μH, preferably comprised between 0.2 μH and 0.5 μH.

The advantage of this configuration is that ohmic losses are reduced.

According to a further embodiment of the present invention, a printed circuit is provided wherein the antenna has a path length and the printed circuit further comprises at least one antenna path portion having an additional path length, wherein the at least one antenna path portion is configured to be selectively connected to the antenna, so as to increase the path length by a length corresponding to the additional path length and so as to adjust the resonance frequency of the antenna, in order to match a predefined resonance frequency, for instance a resonance frequency comprised within the range defined in ISO 14443 standards.

The advantage of this configuration is that the at least one antenna path portion may be connected to the antenna, so as to increase the inductance of the resulting antenna. For instance the antenna and the at least one antenna part portion may be further connected to the one or more SMD capacitors of the printed circuit, in order to adjust also the capacitance of the resulting electronic circuit. These adjustments make it possible to vary the resonance frequency of the electronic circuit comprising the antenna, the at least one antenna path portion and the SMD capacitors, in order to match a predefined resonance frequency, for instance a resonance frequency comprised within the range defined in ISO 14443 standards.

Preferably, the at least one antenna path portion is located on the first side of the printed circuit substrate, together with the antenna wiring pattern. The antenna path portion extends continuously between a third terminal and a fourth terminal. According to a preferred embodiment, the first terminal of the antenna wiring pattern is connected, for instance by means of wire bonding, to the third terminal of the antenna path portion. In this way, a resulting antenna extending between the fourth terminal of the antenna path portion and the second terminal of the antenna wiring pattern is obtained. The resulting antenna has a resulting inductance that is different (greater) from the inductance of the original antenna wiring pattern. In this way, the resulting inductance may compensate for variations in the internal capacitance of the IC chips, for instance when changing or sourcing from different suppliers, and may tune the resonance frequency.

For example, depending on the capacitance of the IC chip connected to the printed circuit, there might be or might not be a need to connect the additional antenna portion to the antenna wiring pattern, so as to adjust the inductance of the resulting electronic circuit and to tune the resonance frequency so as to match a predefined resonance frequency, for instance a resonance frequency comprised within the range defined in ISO 14443 standards. Therefore, it has to be understood that the at least one antenna path portion may be electrically connected to the antenna of the printed circuit according to the users' needs and it is thus configured to be selectively connectable to the antenna of the printed circuit.

According to a further embodiment of the present invention, a printed circuit is provided, wherein the antenna wiring pattern is made of a total number of turns equal to or less than four, for example equal to two, three or four, preferably three.

The advantage of this solution is that a low number of turns in the wiring pattern (such as two, three or four turns) reduces the ohmic losses along the signal path on the antenna. Thanks to the reduction of the ohmic losses in the antenna wiring pattern, the printed circuit has shown superior performances with respect to standard printed circuits and it has passed a higher number of test cases, for instance 100%, of the EMVCo L1 PICC Analog tests.

Preferably, the antenna wiring pattern comprises three turns. Preferably, the antenna wiring pattern is made of copper and the copper foil has a thickness comprised between 10 μm and 70 μm.

According to an alternative preferred embodiment, the antenna may comprise two or three turns and may have a thickness of approximately 35 μm.

According to a further embodiment of the present invention, a printed circuit is provided, wherein the antenna is an etched antenna.

The advantage of this solution is that the antenna is formed on the printed circuit in a simple and economic way and that it is possible to etch the antenna and the contacts in a single step.

According to a preferred configuration, the etched antenna may be formed on the first side of the printed circuit substrate. The printed circuit substrate may be a dielectric substrate made of a composite material (for example glass-epoxy) or a plastic material (PET, PEN, polyimide). The printed circuit substrate may comprise one or more layers of adhesive material and may have a thickness in the order of 20 to 200 μm, in order to maintain a flexibility compatible with continue printed circuits manufacturing processes, for instance reel-to-reel processes. Preferably, two sheets of electrically conductive material, for instance copper sheets, may be bonded and\or laminated on both sides of the printed circuit substrate. Each sheet of electrically conductive material may be etched to form contact zones and possible other circuitry elements, for instance defining the wiring pattern of the antenna and the contact pads.

According to a further embodiment of the present invention, a printed circuit is provided, wherein the antenna wiring pattern has a single wire section having a width comprised within the range between 500 μm and 1000 μm.

The advantage of this solution is that the wide trace width reduces ohmic losses along the signal path of the antenna. Accordingly, the antenna shows better performances in terms of communication range with RFID readers and in terms of success in EMVCo L1 Analog PICC tests.

According to a further embodiment of the present invention, a printed circuit is provided, wherein the antenna has a size of 26.8 mm×12.95 mm.

The advantage of this solution is that an enlarged antenna is provided and ohmic losses are accordingly reduced, but, at the same time, the provided antenna is compatible with the manufacturing limit of a 35 mm width for the tapes used in a reel-to-reel process.

According to a further embodiment of the present invention, a module for integration in a smartcard is provided, the module comprising:

A printed circuit as the ones described before; and

An IC chip located on the first side of the printed circuit substrate,

Wherein the at least one surface mount (SMD) capacitor is connected in parallel with the IC chip, so as to tune a resonance frequency of the antenna to match a predefined resonance frequency, for instance a resonance frequency of an RFID reader.

The advantage of this solution is that it provides a single module comprising an antenna, one or more SMD capacitors and an IC chip, wherein the resonance frequency of the resulting electronic circuit is adjustable by acting at the level of the capacitance of the SMD capacitor(s) and/or of the inductance of the antenna. The resonance frequency of the resulting electronic circuit may be advantageously adjusted without replacing the electrical circuit of the antenna and/or the capacitor. In other words, a resonance electric circuit is formed by the antenna, the one or more capacitors and the IC chip, and a radio wave having the corresponding resonance frequency is transmitted during operation. In this way, communication with an external RFID reader can be performed in a contactless manner. The resonance frequency of the resonance circuit composed by the antenna, the one or more SMD capacitors and the IC chip can be determined by the following equation: $f=1/(2\pi\sqrt{LC})$, wherein C is the total capacitance of the equivalent system and L is the total inductance of the equivalent system. According to specific users' needs, different IC chips having different internal capacitance may be employed and added to the module. At the state of the art, when changing the IC chip (that is when changing the capacitance of the IC chip), it is necessary to redesign the antenna accordingly. To the contrary, the present solution provides a single layout, which is compatible with multiple chips, because the resonance frequency of the resulting electronic circuit may be tuned by adding to the circuit one or more capacitors and/or one or more additional antenna path portions. In particular, one or more capacitors may be connected to the antenna so as to change the capacitance of the electronic circuit. Alternatively, one or more antenna path portions may be connected to the antenna so as to adjust the inductance of the electronic circuit.

Moreover, the present solution has also the advantage that contact and contactless features are integrated into a single module, which can be directly inserted in the card body without the need of inserting antenna inlays in the card body.

According to a preferred embodiment, a printed circuit may be provided, wherein the antenna has a low inductance, for instance an inductance of approximately 0.25 μH. A SMD capacitor may be advantageously connected to the antenna so as to compensate for the low inductance and so as to obtain a resonance electric circuit having a resonance frequency meeting predefined resonance frequency. In this way, a coarse tuning of the resonance frequency may be obtained. A second SMD capacitor may be further added to the circuit during the step of wire bonding the IC chip to the antenna and to the contact pads and it may be encapsulated together with the IC chip. The purpose of the second SMD capacitor is that of fine-tuning the resonance frequency, in the event that the antenna is still not at the desired frequency after addition of the first SMD capacitor.

For instance, the IC chip might be a chip designed by NXP, ST Microelectronics or Infineon, For instance, the IC chip may have a capacitance of 56 pF, 68 pF and/or 78 pF respectively.

For example, according to the capacitance of the IC chip connected to the module, there might be or might not be a need to connect one or two SMD capacitors to the antenna, so as to adjust the capacitance and thus the resonance frequency of the resulting electronic circuit and to match a predefined resonance frequency. In a similar way, depending on the capacitance of the IC chip connected to the module, there might be or might not be a need to connect the additional antenna portion to the antenna wiring pattern, so as to adjust the inductance of the resulting electronic circuit and to tune the resonance frequency so as to match a predefined resonance frequency, for instance a resonance frequency comprised within the range defined in ISO 14443 standards. Therefore, it has to be understood that the SMD capacitor may be electrically connected to the other electronic components according to the users' needs and it is thus configured to be selectively connectable in parallel with the IC chip.

According to a further embodiment of the present invention, a module is provided, wherein the first SMD capacitor and the IC chip are encapsulated by means of an encapsulant material.

The advantage of this configuration is that the capacitor and the IC chip may be protected by the encapsulant material.

For instance, the encapsulant material may form an extra thickness with respect to the first side of the printed circuit substrate wherein the capacitor and the IC chip are located (glob top technology).

Preferably, the encapsulant material may further cover the bonding wires used for connecting the IC chip to the contact pads and/or for connecting the IC chip to the antenna.

According to a further embodiment of the present invention, a module may be provided, wherein the printed circuit substrate comprises one or more non-plated holes for allowing a wire bond connection between the one or more contact pads and the IC chip.

The advantage of this solution is that it reduces production costs and simplifies the fabrication of the module and it provides more flexibility in the design aesthetics. Preferably, the module does not comprise any plated holes for connecting the one or more contact pads and the IC chip for a contact mode operation of the smartcard.

According to a further embodiment of the present invention, a module is provided, wherein the IC chip is connected to the antenna and/or to the antenna path portion by means of a wire bonding.

The advantage of this configuration is that the circuit formed by the IC chip and the antenna is formed by means of a wire bonding. Accordingly, production costs are reduced and the fabrication of the module is simplified.

Preferably, a bonding wire is employed for connecting the first and the second terminals of the antenna wiring pattern to the IC chip, in order to complete the inductance path. According to an alternative preferred embodiment, if one or more antenna path portions are added to the electronic circuit, the second terminal of the antenna and the fourth terminal of the antenna path portion are connected to the IC chip by means of wire bonding.

According to a further embodiment of the present invention, a module is provided, wherein the IC chip has a low activation field strength, for instance an activation field strength equal to or lower than 2 A/m, preferably equal to or lower than 0.5 A/m.

The advantage of this configuration is that the module fully complies with EMV requirements and has been shown to pass a high number, even 100%, of the tests of the EMV standards.

According to a further embodiment of the present invention, a smartcard comprising a card body and one of the printed circuits described above and/or one of the modules described above is provided.

The advantage of this configuration is that the contact and contactless features of the smartcard are integrated into a single component and it is thus easier to produce the smartcard. For instance, the smartcard may be a dual smartcard for contact and contactless mode operation. Moreover, the smart card comprising one of the printed circuits and/or modules as the ones disclosed above shows better performances in terms of reduced ohmic losses and increased communication distances with RFIDs.

According to a further embodiment of the present invention, a smartcard is provided, wherein the card body is made of a non-plastic material such as wood, metal or ceramic.

The advantage of this solution is that the material employed for forming the card body is environmentally sustainable. Since it is challenging to embed an electric wire, for instance a copper wire of an antenna, inside a non-plastic material such as wood, metal or ceramic, it is particularly advantageous to employ a printing circuit or a module as the one described before, wherein contact and contactless features are integrated into a single component.

According to a further embodiment of the present invention, a reel-to-reel tape for use in a fabrication process of a smartcard is provided, the reel-to-reel tape comprising a plurality of printed circuits as the ones described above.

The advantage of this solution is that a reel-to-reel process is a continuous process that enables production of a large amount of printed circuits in a fast and efficient way.

According to a further embodiment of the present invention a reel-to-reel tape for use in a fabrication process of a smartcard is provided, wherein the reel-to-reel tape comprises a plurality of modules as the one described above.

The advantage of this configuration is that a reel-to-reel process is a continuous process that ensures fabrication of a large amount of modules in a fast and efficient way.

According to a further embodiment, the reel-to-reel tape has a width of 35 mm.

The advantage of this solution is that a reel-to-reel tape having a width of 35 mm is compatible with standard tools used in the fabrication of smartcards, but, at the same time, it can accommodate enlarged antennas having a size, for instance, of 26.8×12.95 mm.

BRIEF DESCRIPTION OF THE DRAWINGS

The present invention will be explained in detail with regard to the accompanying drawings in which.

DETAILED DESCRIPTION

Figure 1:
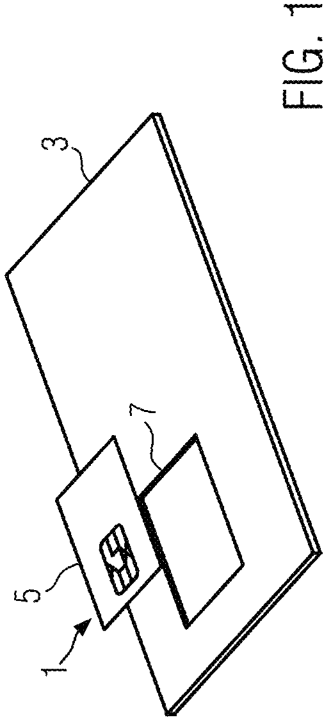
FIG. 1 schematically shows a three-dimensional view of a dual interface smart card in accordance with some illustrative embodiments of the present disclosure.

FIG. 1 schematically shows, in an exploded perspective view, a smart card 1 comprising a card body 3 and a module 5. The module 5 may comprise a contact communication feature (schematically depicted in the module 5 of FIG. 1), configured to communicate with an external contact and at least one chip (not illustrated) of the smart card 1, and a contactless communication feature, such as an antenna (not illustrated), configured to communicate with same chip when receiving an external electro-magnetic field.

In accordance with some illustrative embodiments, the card body 3 of the smart card 1 may be made of any material, e.g. a plastic or non-plastic material, such as a rigid plastic material, a flexible plastic material, and a non-plastic material such as a metal, a ceramic or wood. For example, a plastic material may include at least one of PVC, PVC/ABS, PET, PETG and polycarbonate. In other words, the card body 3 is not limited to a particular material and may be made of any material because the functions of the smart card 1 may be provided by the module 5, which is to be integrated into the card body.

Referring to FIG. 1, an integration of the module 5 into the card body 3 of the smart card 1 may be achieved by forming an opening 7 in the card body 3 (e.g. by milling), so that the module 5 may be accommodated into the opening 7 when integrating the module 5 into the card body 3. The opening 7 may be a recess partially extending into the card body along a thickness direction of the card body 3 or the opening 7 may be a through hole extending through an entire thickness of the card body 3.

Preferably, a recess 7 fitting the module size is milled into the card body 3 and the module 5 is implanted according to standard smart card process. Preferably, it may be necessary to adapt the tooling to the actual size of the module to be implanted. For example, the DIF module 5 according to the present invention may be bigger than the standard ones; hence the tooling must be adapted to the actual size of the module to be implanted.

The module 5 may include one or more chips (not illustrated) such that the entire functionality of the smart card 1 may be integrated into the module 5. In some exemplary embodiments, the module 5 may include a chip for implementing a card of a dual type, wherein the chip is configured to communicate with an external contact or contactless reader (not illustrated).

In accordance with some illustrative embodiments of the present disclosure, the module is not limited to a particular size as long as the size of the module 5 is smaller than geometric dimensions provided by the card body. For example, a size of the module 5 may be only limited by the dimensions of the card body 3 together with optional considerations regarding an aesthetic appearance of the smart card 1.

In some illustrative embodiments, the module 5 of FIG. 1 may correspond to the module 200 of FIGS. 2, 3,4*a* and 6, described below. In some other illustrative embodiments, the module 5 of FIG. 1 may correspond to the module 200' of FIG. 4*b* described below. In some other illustrative embodiments, the module 5 of FIG. 1 may correspond to the module 200" of FIG. 4*c* described below.

Figure 2:
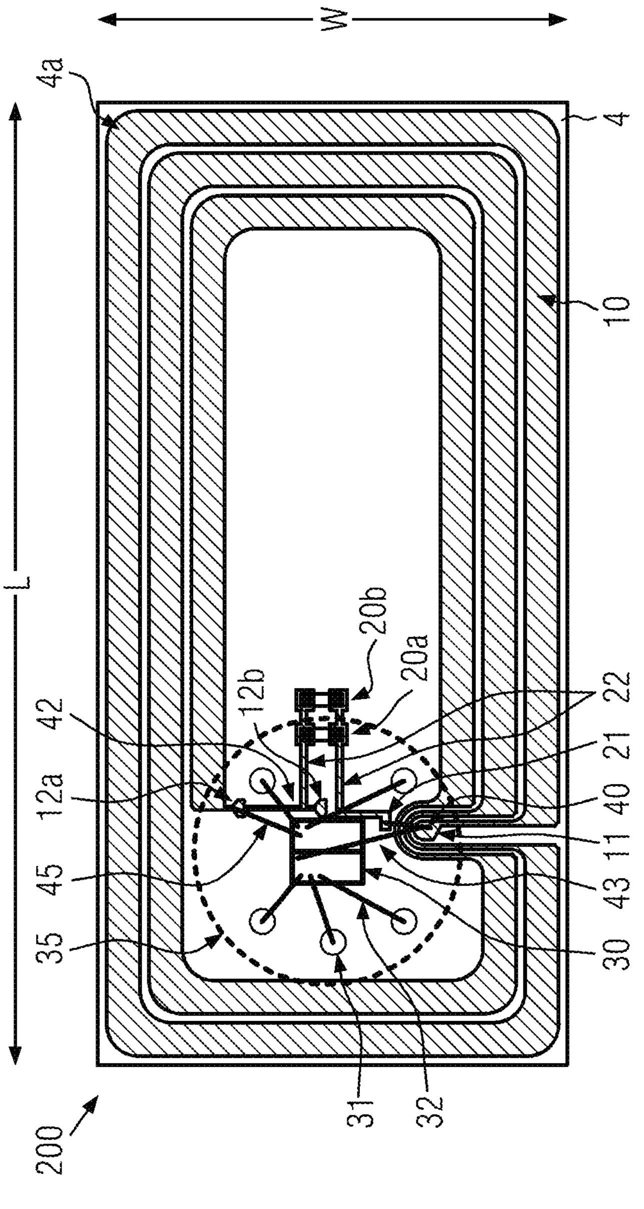
FIG. 2 schematically shows a top view of a layout of a first side of a module in accordance with some illustrative embodiments of the present disclosure.

FIG. 2 schematically illustrates a top view of a module 200 for integration in a smart card, according to an embodiment of the present invention.

The module 200 comprises a printed circuit 100 for integration in a smart card and an IC chip 30. The printed circuit 100 of FIG. 2 comprises a printed circuit substrate 4 of dielectric material (not visible), having a first side 4*a* and a second side 4*b*; an antenna 10, located on the first side 4*a* of the printed circuit substrate 4; a first SMD capacitor 20*a* connected to the antenna 10; a second SMD capacitor 20*b* configured to be selectively connectable to the antenna 10; a plurality of contact pads 50 for external connection (not shown), which may be located on the second side 4*b* of the printed circuit substrate 4.

In FIG. 2, only the first side 4*a* of the printed circuit substrate is illustrated, therefore only the antenna 10, the SMD capacitors 20*a*, 20*b* and the IC chip 30 are visible. According to the illustrative and not limiting configuration of the module 200 of FIG. 2, the contact pads 50 are located on the second side 4*b* of the printed circuit substrate 4 and hence are not visible in this figure.

The antenna 10 has a wiring pattern that extends continuously between a first terminal 11 and a second terminal 12*a*. As it will be explained below, the antenna 10 further comprises an additional terminal 12*b*, so that the printed circuit 100 is compatible with chips 30, 30', 30" having different capacitances and different bonding layouts. The second terminal 12*a* and the additional terminal 12*b* of the antenna 10 are connected by means of the etched trace 42.

The wiring pattern of the antenna 10 comprises three turns and a wide width, for instance between 500 μm and 1000 μm. The configuration of the antenna wiring pattern comprising a small number of turns, for instance between two and four turns, and a wide width ensures minimization of ohmic losses along the antenna path. In this way, the antenna 10 of the configuration of FIG. 2 has lower ohmic losses with respects to standard antennas and conforms to EMVCo standards. The antenna 10 may preferably have a length L of 26.8 mm and a width W of 12.95 mm.

According to an illustrative manufacturing process, the antenna wiring pattern 10 may be formed by means of a chemical etching process.

A sheet of electrically conductive material is positioned on the first side 4*a* of the substrate layer 4. The conductive material may be for example copper, aluminum or an alloy of copper or aluminum. Patterns are then photolithographed on the sheet of electrically conductive material by deposition, exposure and development of a photosensitive resin. A chemical etching step is used to form the antenna wiring pattern 10, comprising the first antenna terminal 11, the second antenna terminal 12*a* and the additional anternna terminal 12*b*. Moreover, the chemical etching step can be used to form an etched path 22 connected to the antenna wiring pattern 10. The etched path 22 may comprise an etched pad 21 and may be configured for successive positioning and fixing of the SMD capacitors 20*a*, 20*b*, as it will be described below. The resin protecting the patterns during etching is then chemically removed and additional metal layers (e.g. Nickel, Gold, Palladium) are optionally electrochemically or chemically deposited on the etched patterns.

In preferred configurations, the design of the module 200 may be modified so that the first terminal 11 of the antenna 10 is placed near the IC chip 30, in the encapsulation area. This type of design is for instance disclosed in the patent EP 2877965 B1 from the same applicant, whose content is herein incorporated by reference.

One or more SMD capacitors 20*a*, 20*b* may be mechanically and electrically connected in parallel to the antenna 10 of the printed circuit 100. For instance, in FIG. 2, two SMD capacitors 20*a*, 20*b* are illustrated. However, it has to be clear that any number of capacitors may be provided, for instance one, three, four, five or more, without departing from the teachings of the present disclosure.

According to an illustrative manufacturing process, the first SMD capacitor 20*a* may be positioned on the etched path 22 and may be fixed to it by means of a surface mounting technology process. The etched path 22 comprises two parallel etched traces, which are connected to each other only when mounting the first SMD capacitor 20*a*. For instance, the first SMD capacitor 20*a* may be fixed to the etched path 22 by means of conductive materials, such as solder, ACP, ACF and the like. In this way, an electronic connection between the first SMD capacitor 20*a* and the antenna 10 may be obtained via the etched path 22 and the etched pad 21.

In a similar way, the second SMD capacitor 20*b* may be positioned on the etched path 22 and may be fixed to it by means of a surface mounting technology process. The second SMD capacitor 20*b* may be selectively connected in parallel to the antenna 10, by fixing it to the etched path 22 according to the user's needs, as explained in the following.

On a portion of the printed circuit substrate 4 not covered by the antenna wiring pattern 10, an IC chip 30 is located. The electronic chip 30 may be mechanically coupled to the substrate by means of known technologies, for instance by means of a die-attach technology. The electronic chip 30 may be electrically connected to the other electrical components of the module 200 by means of known technology, such as flip-chip technology, wire-bonding technology and the like. Preferably, the IC chip 30 is connected to the antenna 10 by wire bonding.

In the configuration illustrated in FIG. 2, the connection between the first terminal 11 of the antenna 10 and the IC chip 30 is realized by means of bonding wire 43; the electrical connection between the second terminal 12*a* of the antenna 10 and the IC chip 30 is realized by means of bonding wire 45; the first terminal 11 of the antenna 10 is connected to the first etched pad 21 of the capacitor(s) 20*a*, 20*b* by means of bonding wire 40.

Figure 3:
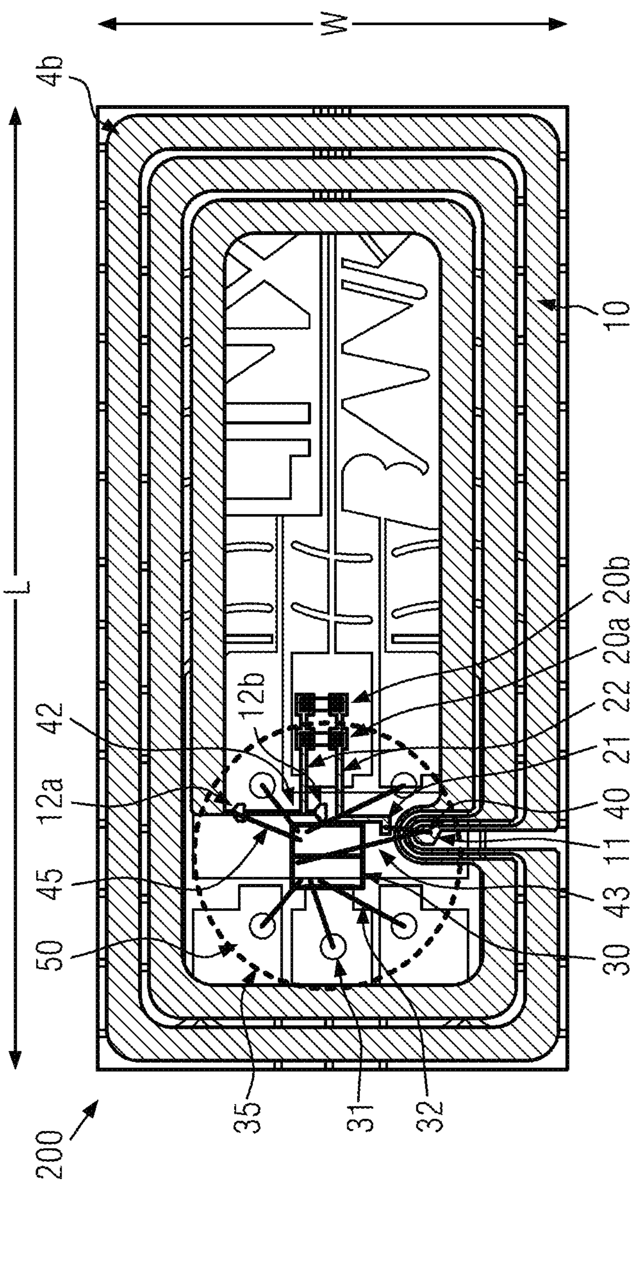
FIG. 3 schematically shows a perspective view of a dual interface module in accordance with some illustrative embodiments of the present disclosure.

In accordance with some illustrative examples, the chip 30 of FIGS. 2 and 3 may be of the chip type supplied by NXP, ST Microelectronics and/or Infineon with a capacitance of 56 pF, 68 pF or 78 pF, respectively.

According to an illustrative manufacturing process, after connection of the IC chip 30 to the antenna 10 by wire bonding, the IC chip 30 and the first SMD capacitor 20*a* are encapsulated by means of an encapsulant material 35. The encapsulant material 35 preferably covers also bonding wires 32, 40, 42, 43, 45, whose function will be described below.

The first SMD capacitor 20*a* is advantageously connected to the antenna 10 at an early stage of the fabrication process of the module 200. For example, the first capacitor 20*a* is connected to the electronic circuit before encapsulation of the first capacitor 20*a* and the IC chip 30 in the encapsulant material 35.

On the other hand, the second SMD capacitor 20*b* may be connected to the electronic circuit at a later stage of the fabrication of the module 200, for example after connection of the first SMD capacitor 20*a* and after applying the encapsulant material 35. In fact, the second SMD capacitor 20*b* is preferably not covered by encapsulant material, in order to allow flexibility in its positioning and in fine-tuning the resonance frequency of the electric circuit, as it will be detailed below.

The present invention is based on the idea of providing a printed circuit with one or two SMD capacitors 20*a*, 20*b*, which may be connected in parallel to the electronic circuit comprising the antenna 10 and the IC chip 30 so as to adjust the resonance frequency of the electronic circuit and to enable communication within the standard RFID frequency detection range. In fact, the antenna 10 and the IC chip 30 may form a resonance circuit having an initial resonance frequency equal to $f=1/(2\pi\sqrt{LC})$, wherein C is the total capacitance of the equivalent system and L is the total inductance of the equivalent system. The capacitance of the IC chip 30 may for example vary according to different suppliers and/or different users' needs. The resonance frequency of the resonance circuit needs to comply with specific standards for RF communication, for instance with ISO 4443 standards. By additionally connecting one or two SMD capacitors 20*a*, 20*b* to the resonance circuit comprising the IC chip 30 and the antenna 10, it is possible to adjust the resonance frequency of the resulting electronic circuit so as to match a predefined resonance frequency within the standard RFID frequency detection range. By adding only one capacitor 20*a* to the circuit, a coarse tuning of the resulting resonance frequency is possible. By adding two capacitors 20*a*, 20*b* to the circuit, a fine-tuning of the resulting resonance frequency is obtained. According to alternative configurations (not shown), additional SMD capacitors (three, four, five or more) could be further added to the electronic circuit so as to fine tune the resonance frequency.

For example, a printed circuit 100 may be provided, wherein the antenna 10 has an inductance of 0.25 μm and the IC chip 30' (see FIG. 4*b* below) has an internal capacitance of 68 pF, thus resulting in a resonance frequency of 39 MHz, which does not fall within the required range for RFID communication. By adding for instance a first SMD capacitor 20*a* having a capacitance of 470 pF to the circuit, a first resonance frequency of 13.8 MHz may be obtained. By adding for example a second SMD capacitor 20*b* having a capacitance of 20 pF to the circuit, an optimized resonance frequency of 13.7 MHz may be obtained.

Therefore, it has to be understood that the module 200 may be configured so as to connect one SMD capacitor 20*a* to the IC chip 30 and to the antenna 10, so as to form a first electronic circuit having a first resonance frequency matching a predefined resonance frequency for RF communication. Alternatively, two SMD capacitors 20*a*, 20*b* may be connected in parallel to the IC chip 30 and to the antenna 10 so as to form a second electronic circuit so as to fine-tune the first resonance frequency and obtain an optimized resonance frequency within the standard RFID detection range.

FIG. 3 schematically illustrates a perspective view of the module 200, according to an embodiment of the present invention. In particular, FIG. 3 schematically illustrates the module 200 of FIG. 2, but it also shows the contact pads 50, which are located on the second side 4*b* of the printed circuit substrate 4. In FIG. 3, five contact pads 50 are schematically illustrated, however it has to be understood that any number of contact pads complying with different standards may be provided. The contact pads 50 may be electrically coupled to an external device for powering the IC chip 30 of the module 200 and for allowing communication between chip and reader in contact mode.

The module 200 of FIGS. 2 and 3 further comprises a plurality of blind holes 31 formed on the first side 4*a* of the printed circuit substrate 4. Even if five blind holes 31 are illustrated in FIG. 2, it has to be understood that any number of blind holes 31 may be provided, for instance, one, two, three, four, six, seven or more. The blind holes 31 may comprise non-plated holes 31, which can ensure wire bonding between the contact pads 50 and the IC chip 30 for contact mode operation of the module. Preferably, the number of blind holes 31 corresponds to the number of contact pads 50.

The module according to the present invention has the advantage that a single layout of the printed circuit 100 is compatible with different IC chips having different capacitances and also different designs for wire bonding. This concept is exemplified in reference to FIGS. 4*a*, 4*b* and 4*c*.

Figure 4C:
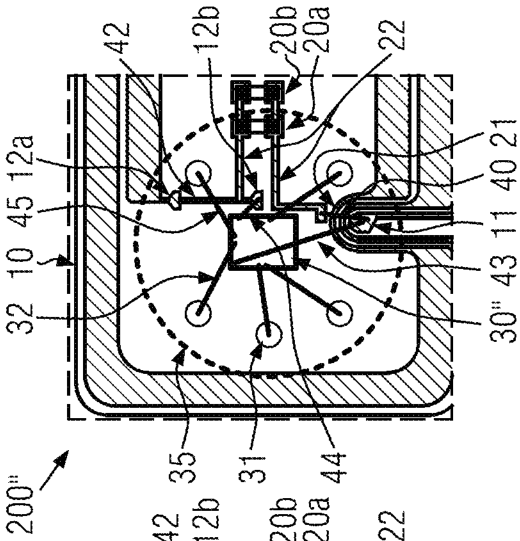
FIG. 4*c* schematically shows a top view of a first side of a module in accordance with some other illustrative embodiments of the present disclosure.
Figure 4B:
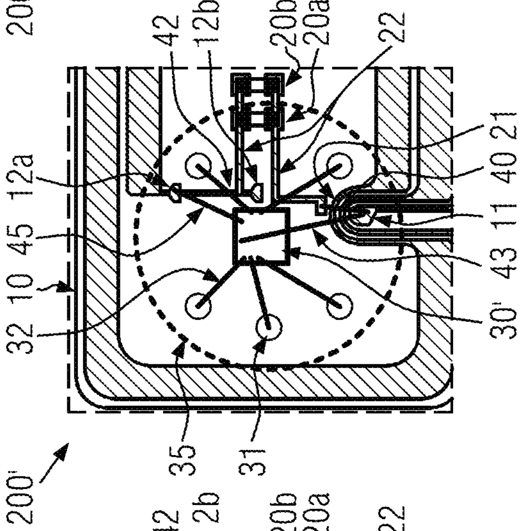
FIG. 4*b* schematically shows a top view of a first side of a module in accordance with some other illustrative embodiments of the present disclosure.
Figure 4A:
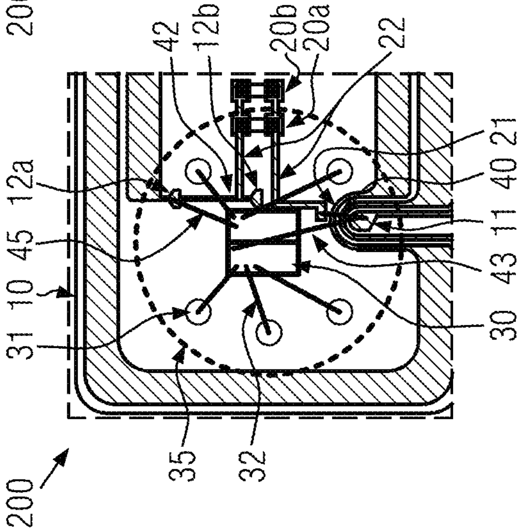
FIG. 4*a* schematically shows a top view of a first side of a module in accordance with some illustrative embodiments of the present disclosure.

FIG. 4*a* schematically illustrates a detail of the module 200 comprising the IC chip 30, according to an embodiment of the present invention.

In the electric circuit schematically illustrated in FIG. 4*a*, the IC chip 30 and the antenna 10 are connected by means of wire bonding. The first terminal 11 of the antenna 10 is connected to the IC chip 30 by means of bonding wire 43, while the second terminal 12*a* of the antenna 10 is connected to the IC chip 30 by means of bonding wire 45. In this way, the inductance path is formed. The first terminal 11 of the antenna 10 is further connected to the etched pad 21 of the parallel of two SMD capacitors 20*a*, 20*b* by means of bonding wire 40. The second terminal 12*a* of the antenna 10 is connected to the etched path 22 on which the two SMD capacitors 20*a*, 20*b* are mounted by means of via the etched trace 42. In this way, the two SMD capacitors 20*a*, 20*b* are connected in parallel to the IC chip 30.

In the configuration of FIG. 4*a*, the IC chip 30, the first SMD capacitor 20*a* and the bonding wires 32, 40, 42, 43, 45 are encapsulated by means of an encapsulant material 35, whereas the second SMD capacitor 20*b* is not covered by the encapsulant material 35.

The IC chip 30 is further connected to the contact pads 50 (not shown) by means of the non-plated holes 31 and the bonding wires 32. Five bonding wires 32 are employed to connect the IC chip 30 to the contact pads 50.

In accordance with some illustrative example, the chip 30 of FIG. 4*a* may be of the chip type supplied by Infineon with a capacitance of 78 pF and the first SMD capacitor 20*a* may have a capacitance of 460 pF.

FIG. 4*b* schematically illustrates a detail of the module 200' comprising the IC chip 30', according to an alternative embodiment of the present invention.

In the electric circuit schematically illustrated in FIG. 4*b*, the IC chip 30' and the antenna 10 are connected by means of wire bonding. The first terminal 11 of the antenna 10 is connected to the IC chip 30' by means of bonding wire 43, while the second terminal 12*a* of the antenna 10 is connected to the IC chip 30' by means of bonding wire 45. In this way, the inductance path is formed. The first terminal 11 of the antenna 10 is further connected to the etched pad 21 of the parallel of two SMD capacitors 20*a*, 20*b* by means of bonding wire 40. The second terminal 12*a* of the antenna 10 is further connected to the etched path 22 on which the two SMD capacitors 20*a*, 20*b* are mounted by means of the etched trace 42. In this way, the two SMD capacitors 20*a*, 20*b* are connected in parallel to the IC chip 30'.

In the configuration of FIG. 4*b*, the IC chip 30', the first SMD capacitor 20*a* and the bonding wires 32, 40, 42, 43, 45 are encapsulated by means of an encapsulant material 35, whereas the second SMD capacitor 20*b* is not covered by the encapsulant material 35.

The IC chip 30' is further connected to the contact pads 50 (not shown) by means of the non-plated holes 31 and the bonding wires 32. Five bonding wires 32 are employed to connect the IC chip 30 to the contact pads 50.

In accordance with some illustrative example, the chip 30' of FIG. 4*b* may be of the chip type supplied by ST Microelectronics with a capacitance of 68 pF and the first SMD capacitor 20*a* may have a capacitance of 470 pF.

FIG. 4*c* schematically illustrates a detail of the module 200" comprising the IC chip 30", according to an alternative embodiment of the present invention.

In the electric circuit schematically illustrated in FIG. 4*c*, the IC chip 30" and the antenna 10 are connected by means of wire bonding. The first terminal 11 of the antenna 10 is connected to the IC chip 30" by means of bonding wire 43. Conversely to the configurations shown in FIGS. 4*a* and 4*b*, the second terminal 12*a* of the antenna 10 is not directly connected to the IC chip 30": the second terminal 12*a* is connected to the additional terminal 12*b* via the etched trace 42 and the additional terminal 12*b* is connected to the IC chip 30" by means of bonding wire 44. In this way, the inductance path is closed. Thanks to the configuration of the antenna wiring pattern 10 comprising two "end" terminals 12*a* and 12*b* formed along the etched trace 42, it is hence possible to use the same configuration of the printed circuit 100 to connect IC chips 30, 30', 30" having different bonding layouts.

The first terminal 11 of the antenna 10 is further connected to the etched pad 21 of the parallel of two SMD capacitors 20*a*, 20*b* by means of bonding wire 40. The additional terminal 12*b* of the antenna 10 is connected to the etched path 22 on which the two SMD capacitors 20*a*, 20*b* are mounted. In this way, the two SMD capacitors 20*a*, 20*b* are connected in parallel to the IC chip 30".

In the configuration of FIG. 4*c*, the IC chip 30", the first SMD capacitor 20*a* and the bonding wires 32, 40, 42, 43, 44, 45 are encapsulated by means of an encapsulant material 35, whereas the second SMD capacitor 20*b* is not covered by the encapsulant material 35.

The IC chip 30" is further connected to the contact pads 50 (not shown) by means of the non-plated holes 31 and the bonding wires 32. Five bonding wires 32 are employed to connect the IC chip 30 to the contact pads 50.

In accordance with some illustrative example, the chip 30" of FIG. 4*c* may be of the chip type supplied by NXP with a capacitance of 56 pF and the first SMD capacitor 20*a* may have a capacitance of 480 pF.

Preferably, the IC chips 30, 30', 30" require an activation field strength lower than 2 A/m, preferably lower than 0.5 A/m. In this way, better performances of the modules 200, 200', 200" are ensured, since they have proved to pass a higher number, even 100%, of the EMVCo L1 PICC analog test cases in these conditions.

Figure 5:
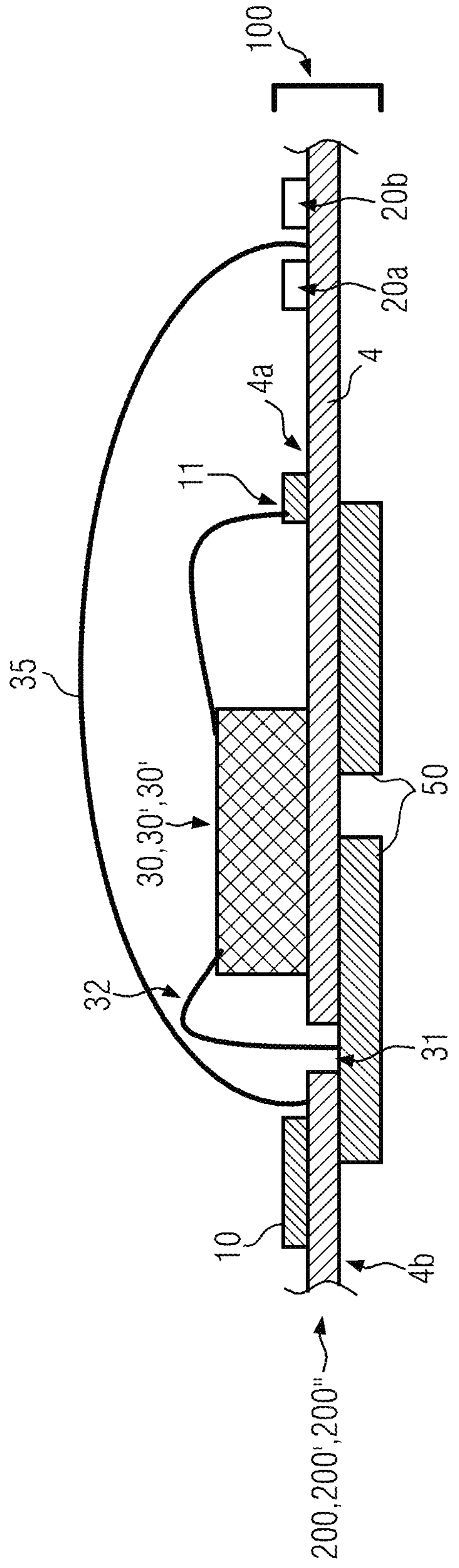
FIG. 5 schematically shows a cross sectional view of a dual interface module in a wire bonding configuration with non-plated holes, in accordance with some illustrative embodiments of the present disclosure.

FIG. 5 schematically shows a cross sectional view of a dual interface module 200, 200', 200" in accordance with some illustrative embodiments of the present disclosure.

The dual interface module 200, 200', 200" of FIG. 5 comprises a printed circuit 100 and an IC chip 30, 30', 30". The printed circuit 100 comprises a printed circuit substrate 4 of dielectric material having a first side 4*a* and a second side 4*b*. On the first side 100*a*, the IC chip 30, 30', 30", the antenna pattern 10 and the capacitors 20*a*, 20*b* are formed, whereas, on the second side 100*b* of the printed circuit substrate 4, the external contact pads 50 are positioned. The IC chip 30, 30', 30" is connected to the contact pads 50 by means of bonding wires 32. The IC chip 30, 30', 30", the capacitors 20*a*, 20*b* and the bonding wires 32 are protected by an encapsulant material 35.

Holes 31 are formed in the connector substrate 4, allowing wire bonding between the contact pads 50 of the external contact pattern and the chip 30, 30', 30". The holes 31 shown in FIG. 5 are non-plated, blind holes providing a direct connection between the wire 32 and the bottom side of the contact pad 50.

According to a manufacturing process for producing non-plated blind holes, a substrate layer 4 is provided and at least one sheet of electrically conductive material is positioned on its first side. The conductive material may be for example copper, aluminum or an alloy of copper or aluminum. The second side of the substrate layer 4 is coated with an adhesive material (not shown). The substrate layer 4 coated with the adhesive and conductive material is then perforated, for example by mechanical punching or laser, to form holes 31 and possibly side openings (sprocket holes) used for guiding a web in a reel-to-reel process. A second sheet of electrically conductive material is then laminated to the second side of the substrate layer 4. The holes 31 are then so-called "blind" holes as they are closed on one side by the metal foil. Alternatively a dielectric substrate 4 with conductive material on both sides might be provided and holes 31 might be formed in dielectric layer and in the first layer of conductive material using a laser.

Patterns are then photolithographed on the two sheets of electrically conductive material by deposition, exposure and development of a photosensitive resin. A chemical etching step is used to pattern the electrical circuits on both sides of the substrate (i.e. contact pads 50 of FIGS. 3 and 5, antenna 10 and antenna terminals 11, 12*a*, 12*b*, etched paths 22, 42, etc.). The resin protecting the patterns during etching is then chemically removed and additional metal layers (e.g. Nickel, Gold, Palladium) are optionally electrochemically or chemically deposited on the etched patterns and on the bottom of the holes 31.

Figure 6:
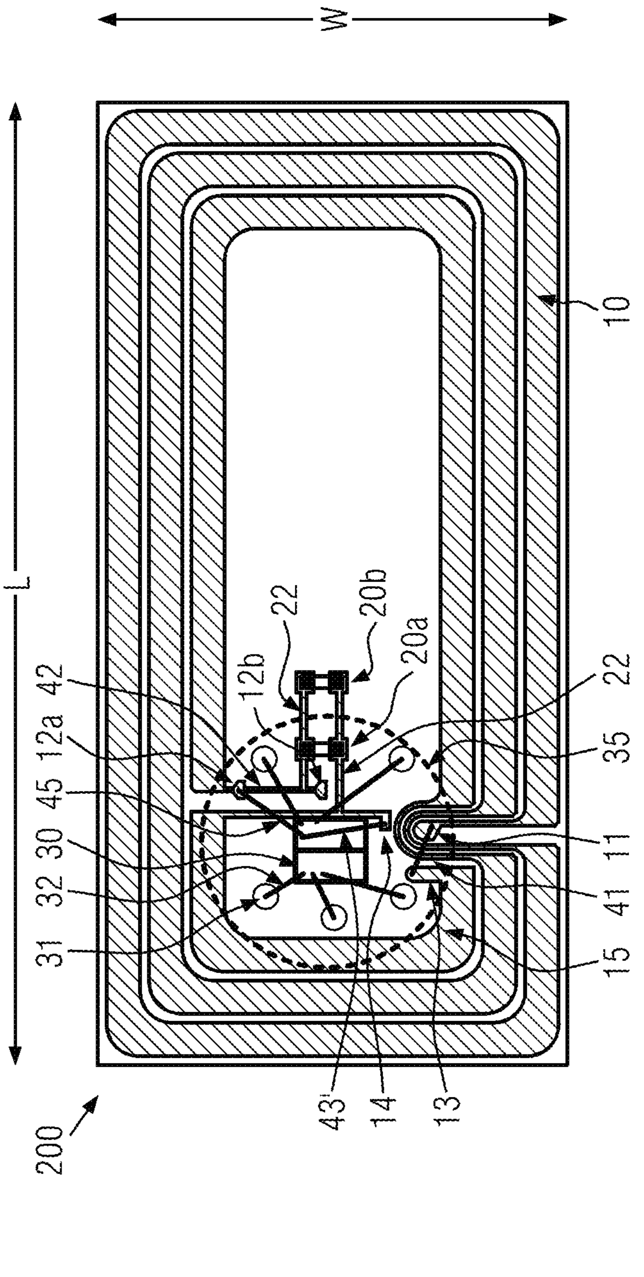
FIG. 6 schematically shows a top view of a layout of a first side of a module in accordance with some alternative embodiments of the present disclosure.

FIG. 6 schematically illustrates a top view of a module 200 according to an alternative embodiment of the present invention.

The module 200 illustrated in FIG. 6 comprises a substrate 4, on top of which an antenna wiring pattern 10, two SMD capacitors 20*a*, 20*b* and an IC chip 30 are located. The module 200 of FIG. 6 further comprises an antenna path portion 15 continuously extending between a third terminal 13 and a fourth terminal 14.

In the configuration shown in FIG. 6, the first terminal 11 of the antenna 10 is connected to the third terminal 13 of the antenna path portion 15 by means of a bonding wire 41. In this way, the module 200 comprises an increased antenna, which comprises the antenna wiring pattern 10 and the antenna path portion 15 and which continuously extends between a second terminal 12*a* and a fourth terminal 14. Accordingly, the resulting inductance of the increased antenna is greater than the inductance of the antenna wiring pattern 10.

The second terminal 12*a* is connected to the additional terminal 12*b* via the etched trace 42.

The second terminal 12*a* of the increased antenna is connected to the IC chip 30 by means of the bonding wire 45 and the fourth terminal 14 of the increased antenna is further connected to the IC chip 30 by means of bonding wire 43' so as to close the inductance path.

In the configuration shown in FIG. 6, the second terminal 12*a* and the fourth terminal 14 of the increased antenna are further connected to the etched path 22 on which the SMD capacitors 20*a*, 20*b* are mounted via the corresponding etched traces. In this way, the two capacitors 20*a*, 20*b* are further connected in parallel to the IC chip 30, so as to form a resonance frequency having an increased capacitance and so as to match a predefined resonance frequency, as described above.

The module 200 of FIG. 6 thus enables not only to selectively connect one or two SMD capacitors 20*a*, 20*b* to the electric circuit comprising the antenna 10 and the IC chip 30 to adjust the resonance frequency, but it also enables to selectively connect the antenna path portion 15 to the antenna wiring pattern 10. Accordingly, it has to be understood that different options are possible: an electric circuit comprising the antenna 10, the IC chip 30 and one capacitor 20*a*; an electric circuit comprising the antenna 10, the IC chip 30 and both capacitors 20*a*, 20*b*; an electric circuit comprising the antenna 10, the IC chip 30, both capacitors 20*a*, 20*b* and the antenna path portion 15. Alternatively, a configuration of the electric circuit is also possible, wherein the electric circuit may comprise the antenna 10, the antenna path portion 15, one capacitor 20*a* and the IC chip 30. In this way, it is possible to fine tune the resonance frequency of the resulting electronic circuit so as to match a predefined resonance frequency for RFID communication.

Therefore, it has to be understood that, the layout of the module 200 of FIG. 6 may be advantageously employed with different IC chips 30, 30', 30" provided by different suppliers and/or having different capacitances, for instance a capacitance of 56 pF, of 68 pF and/or of 78 pF. According to the internal capacitance of the IC chips 30, 30' and 30", one or more of the configurations disclosed above may be preferred.

In accordance with some embodiments of the present disclosure, a reel-to-reel tape process is used for fabricating the smart card 1. For instance, the reel-to-reel tape may comprise a plurality of printed circuits 100. For instance, the reel-to-reel tape may comprise a plurality of modules 200, 200', 200" comprising the printed circuit 100 and the IC chip 30, 30', 30".

In some illustrative and not limiting embodiments, the tape may have a width of about 35 mm and may comprise a plurality of enlarged antennas having a length of 26.8 mm and a width of 12.95 mm. The size of 26.8 mm×12.95 mm represents in fact the manufacturing limit for fabricating an enlarged antenna by exploiting a standard 35 mm tape. Accordingly, a printed circuit according to the present invention may be provided which can be designed to be compatible with multiple types of chips, such as chips manufactured by NXP, Infineon and STM (ST Microelectronics) suppliers.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

LIST OF REFERENCES

1: smart card
3: card body
4: substrate
4*a*: first side of substrate
4*b*: second side of substrate
5: module
7: opening in the card body
10: antenna
11: first antenna terminal (start)
12*a*: second antenna terminal (end)
12*b*: additional antenna terminal
13: third terminal of antenna path portion
14: fourth terminal of antenna path portion
15: antenna path portion
20*a*, 20*b*: capacitors
21: capacitor etched pad
22: etched path
30, 30', 30": IC chip
31: non-plated hole
32: bonding wire
40, 41, 43, 43', 44, 45: bonding wires
42: etched trace
50: contact pads
100: printed circuit
200, 200', 200": module
L: length
W:width

The invention claimed is:

1. A printed circuit for integration in a smart card, said printed circuit comprising:

a printed circuit substrate of dielectric material having a first side and a second side;

an antenna having a wiring pattern extending between a first terminal and a second terminal and being located on said first side of said printed circuit substrate, said antenna having a resonance frequency;

one or more contact pads located on said second side of said printed circuit substrate and forming an external contact pattern; and at least a first surface mount (SMD) capacitor connected to said first terminal and said second terminal of said antenna so as to adjust said resonance frequency of said antenna, in order to match a predefined resonance frequency, wherein said first surface mount capacitor and said first terminal and said second terminal of said antenna are formed on the same side of said printed circuit substrate, and wherein said first terminal of said antenna is connected to a first etched pad of said first capacitor by means of wire bonding, wherein said antenna has a path length and said printed circuit further comprises at least one antenna path portion having an additional path length, said at least one antenna path portion extending between a third terminal and a fourth terminal, wherein said first terminal of said antenna is connected to said third terminal of said antenna path portion by means of wire bonding such that a resulting antenna extends between said second terminal and said fourth terminal, wherein said second terminal and said fourth terminal are configured to be connected to an IC chip by means of wire bonding, and wherein said additional path length increases the path length of said resulting antenna so as to adjust said resonance frequency of said antenna, in order to match said predefined resonance frequency.

2. The printed circuit of claim 1, wherein said printed circuit further comprises a second SMD capacitor connected to said first terminal and said second terminal of said antenna, in order to fine tune said resonance frequency of said antenna.

3. The printed circuit of claim 1, wherein said antenna has inductance lower than 0.5 μH.

4. The printed circuit of claim 1, wherein said antenna wiring pattern is made of a total number of turns equal to or less than four.

5. The printed circuit of claim 1, wherein said antenna is an etched antenna.

6. The printed circuit of claim 1, wherein said antenna wiring pattern has a single wire section having a width comprised within the range between 500 μm and 1000 μm.

7. The printed circuit of claim 1, wherein said antenna has a size of 26.8 mm×12.95 mm.

8. A module for integration in a smart card comprising:
a printed circuit comprising:
a printed circuit substrate of dielectric material having a first side and a second side;
an antenna having a wiring pattern extending between a first terminal and a second terminal and being located on said first side of said printed circuit substrate, said antenna having a resonance frequency;
one or more contact pads located on said second side of said printed circuit substrate and forming an external contact pattern; and
at least a first surface mount (SMD) capacitor connected to said first terminal and said second terminal of said antenna so as to adjust said resonance frequency of said antenna, in order to match a predefined resonance frequency,
wherein said first surface mount capacitor and said first terminal and said second terminal of said antenna are formed on the same side of said printed circuit substrate, and
wherein said first terminal of said antenna is connected to a first etched pad of said first capacitor by means of wire bonding,
wherein said antenna has a path length and said printed circuit further comprises at least one antenna path portion having an additional path length, said at least one antenna path portion extending between a third terminal and a fourth terminal,
wherein said first terminal of said antenna is connected to said third terminal of said antenna path portion by means of wire bonding such that a resulting antenna extends between said second terminal and said fourth terminal,
wherein said additional path length increases the path length of said resulting antenna so as to adjust said resonance frequency of said antenna, in order to match a predefined resonance frequency; and
an IC chip located on said first side of said printed circuit substrate,
wherein said second terminal and said fourth terminal are connected to said IC chip by means of wire bonding,
wherein said at least first surface mount (SMD) capacitor is connected in parallel with said IC chip so as to tune a resonance frequency of said antenna to match a predefined resonance frequency.

9. The module of claim 8, wherein said first SMD capacitor and said IC chip are encapsulated by means of an encapsulant material.

10. The module of claim 9, wherein said printed circuit further comprises a second SMD capacitor connected to said first terminal and said second terminal of said antenna, in order to fine tune said resonance frequency of said antenna, and wherein said second SMD capacitor is not encapsulated by said encapsulant material.

11. The module of claim 8, wherein said printed circuit substrate comprises one or more non-plated holes for allowing a wire bond connection between said one or more contact pads and said IC chip.

12. The module of claim 8, wherein said second terminal is connected to said IC chip by a first bonding wire, and wherein said fourth terminal is connected to said IC chip by a second bonding wire.

13. The module of claim 8, wherein said IC chip has a low activation field strength equal to or lower than 2 A/m.

14. A smart card comprising a card body and a module, said module comprising:
a printed circuit comprising:
a printed circuit substrate of dielectric material having a first side and a second side;
an antenna having a wiring pattern extending between a first terminal and a second terminal and being located on said first side of said printed circuit substrate, said antenna having a resonance frequency;
one or more contact pads located on said second side of said printed circuit substrate and forming an external contact pattern; and
at least a first surface mount (SMD) capacitor connected to said first terminal and said second terminal of said antenna so as to adjust said resonance frequency of said antenna, in order to match a predefined resonance frequency,
wherein said first surface mount capacitor and said first terminal and said second terminal of said antenna are formed on the same side of said printed circuit substrate, and
wherein said first terminal of said antenna is connected to a first etched pad of said first capacitor by means of wire bonding
wherein said antenna has a path length and said printed circuit further comprises at least one antenna path portion having an additional path length, said at least one antenna path portion extending between a third terminal and a fourth terminal,
wherein said first terminal of said antenna is connected to said third terminal of said antenna path portion by means of wire bonding such that a resulting antenna extends between said second terminal and said fourth terminal,
wherein said additional path length increases the path length of said resulting antenna so as to adjust said resonance frequency of said antenna, in order to match said predefined resonance frequency; and
an IC chip located on said first side of said printed circuit substrate, wherein said second terminal and said fourth terminal are connected to said IC chip by means of wire bonding.

15. The smart card according to claim 14, wherein the card body is made of a non-plastic material such as wood, metal or ceramic.

16. The printed circuit of claim 3, wherein the inductance is comprised between 0.2 μH and 0.5 μH.

17. The module of claim 13, wherein the activation field strength is equal to or lower than 0.5 A/m.

* * * * *